(12) United States Patent
Zak

(10) Patent No.: US 10,134,080 B2
(45) Date of Patent: Nov. 20, 2018

(54) SYSTEM AND METHOD FOR PREPARING AND DELIVERING ORDERS

(71) Applicant: Fives Intralogistics S.A., Grigny (FR)

(72) Inventor: David Zak, L'Isle D'Abeau (FR)

(73) Assignee: FIVES INTRALOGISTICS S.A., Grigny (FR)

(*) Notice: Subject to any disclaimer, the term of this patent is extended or adjusted under 35 U.S.C. 154(b) by 513 days.

(21) Appl. No.: 14/413,634

(22) PCT Filed: Jul. 4, 2013

(86) PCT No.: PCT/EP2013/064192
§ 371 (c)(1),
(2) Date: Jan. 8, 2015

(87) PCT Pub. No.: WO2014/009257
PCT Pub. Date: Jan. 16, 2014

(65) Prior Publication Data
US 2015/0178816 A1      Jun. 25, 2015

(30) Foreign Application Priority Data

Jul. 12, 2012   (FR) .................... 12 56720

(51) Int. Cl.
*G06F 7/00*       (2006.01)
*G06Q 30/06*      (2012.01)
(Continued)

(52) U.S. Cl.
CPC .......... *G06Q 30/0635* (2013.01); *B25J 11/00* (2013.01); *B65G 1/1378* (2013.01);
(Continued)

(58) Field of Classification Search
None
See application file for complete search history.

(56) References Cited

U.S. PATENT DOCUMENTS

| 5,595,263 A | 1/1997 | Pignataro |
| 8,335,585 B2 | 12/2012 | Hansl et al. |

(Continued)

FOREIGN PATENT DOCUMENTS

| DE | 19910873 A1 | 12/2000 |
| DE | 20112328 U1 | 1/2002 |

(Continued)

*Primary Examiner* — Yolanda R Cumbess
(74) *Attorney, Agent, or Firm* — Davidson, Davidson & Kappel, LLC

(57) ABSTRACT

A system and method for preparing and delivering product orders, such as consumer products, and is applicable in the field of "B-to-C" ("business-to-consumer") marketing of such products (food—general merchandise—DIY, etc.), and more particularly according to a "Drive" marketing mode. The products are distributed into at least two different categories based on their nature.
For each product category, an order preparation zone is provided, including:
  one or more storage and preparation zones for products to be withdrawn,
  one or more storage and reconciliation zones for storing containers containing the withdrawn products, including at least one device for supplying complete orders for that product category,
  a conveying system for conveying empty or full containers from the storage and preparation zone(s) for products to be withdrawn toward the storage and reconciliation zone(s), and vice versa.

22 Claims, 1 Drawing Sheet

(51) Int. Cl.
    *B65G 1/137*    (2006.01)
    *B25J 11/00*    (2006.01)
    *B65G 43/10*    (2006.01)
    *G06Q 10/08*    (2012.01)

(52) U.S. Cl.
    CPC ........... *B65G 43/10* (2013.01); *G06Q 10/087* (2013.01); *B65G 2209/08* (2013.01)

(56) References Cited

U.S. PATENT DOCUMENTS

| | | |
|---|---|---|
| 2004/0247421 A1 | 12/2004 | Saunders et al. |
| 2008/0029595 A1 | 2/2008 | Waller et al. |
| 2008/0105495 A1 | 5/2008 | Mazzoni et al. |
| 2008/0267759 A1 | 10/2008 | Morency et al. |
| 2010/0198391 A1* | 8/2010 | Schafer ............... B65G 1/1378 700/216 |
| 2011/0106295 A1* | 5/2011 | Miranda .............. B65G 1/1378 700/216 |
| 2012/0150340 A1 | 6/2012 | Suess et al. |

FOREIGN PATENT DOCUMENTS

| | | |
|---|---|---|
| EP | 0943561 | 9/1999 |
| EP | 1975091 A2 | 10/2008 |
| EP | 1 995 187 | 11/2008 |
| JP | 2008 037567 | 2/2008 |
| JP | 2011207569 A | 10/2011 |
| WO | WO02006042347 A2 | 8/2006 |
| WO | WO02006088346 A1 | 8/2006 |
| WO | WO 2010/127769 | 11/2010 |

\* cited by examiner

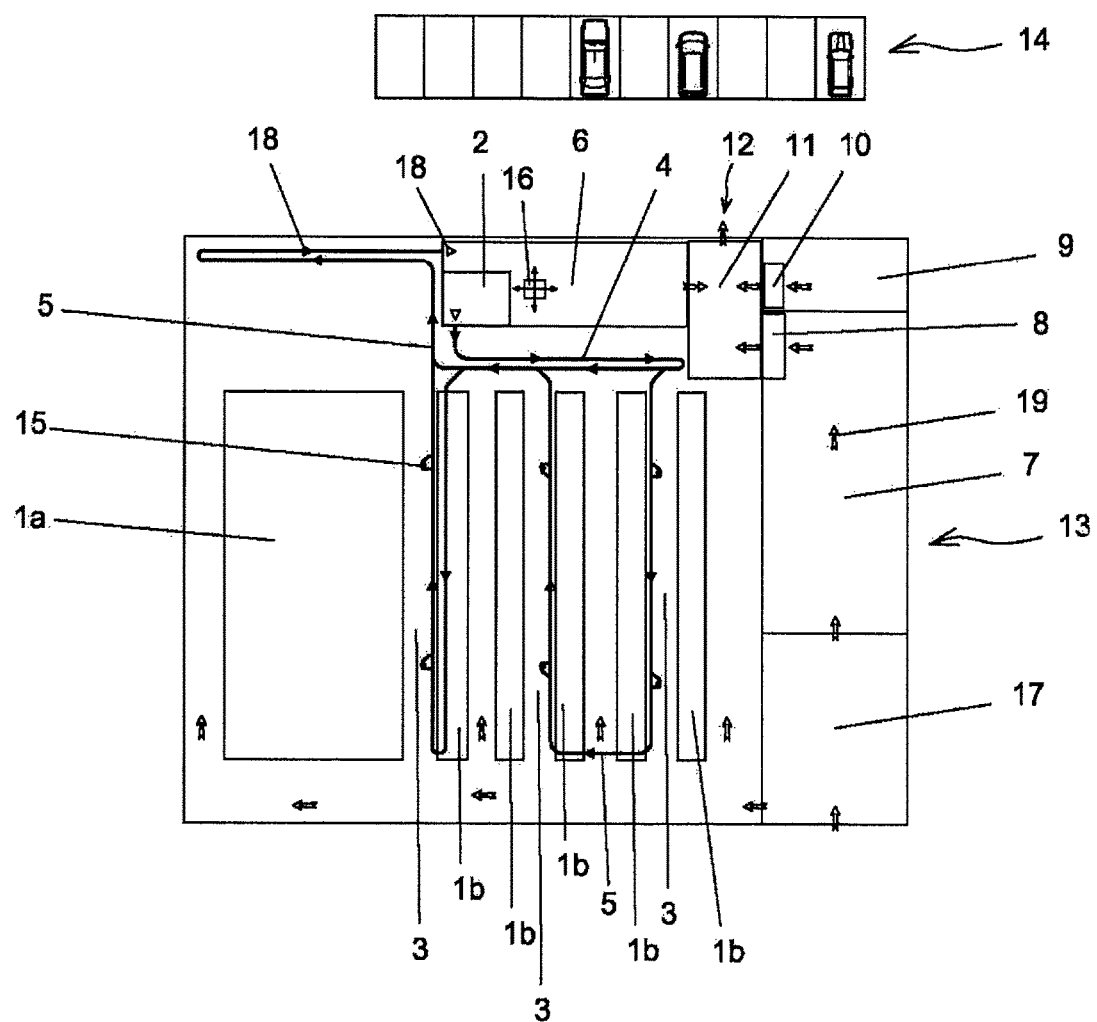

SYSTEM AND METHOD FOR PREPARING AND DELIVERING ORDERS

The invention relates to a system and a method for preparing and delivering orders, in particular for orders of consumer products.

It is also applicable in the field of "B-to-C" ("business-to-consumer") marketing of such products (food—general merchandise—DIY, etc.), and more particularly through the budding concept of "Drive" marketing. This marketing aims to allow the quick retrieval, based on the "Drive In" model, of goods ordered by Internet, after a predefined order preparation time frame (typically 2 hours).

The invention thus aims in particular to resolve the three major issues in this marketing mode:

the preparation and storage of mixed orders (for example dry, cold and frozen products), the volumes and distribution of which cannot be controlled;

the preservation of the cold chain for preparing orders requiring storage by product type (for example dry, cold and frozen products);

the reconciliation (storage by product type) and delivery of orders to customers very shortly after they arrive at the retrieval site and based on an unpredictable schedule.

The "Drive" principle is to allow the customer to place an order, for example by Internet or telephone, which implies low visibly regarding the volumes to be processed and planning for the preparation of orders to be processed. It is consequently necessary to provide an organization and productivity that make it possible to absorb peaks and slack periods in preparation with a constant number of operators.

The flexibility given to the customer regarding the time range to pick up the order significantly deteriorates the organization of the "Drive". It is therefore necessary to provide a temporary storage solution for preparing orders, pending pickup, as well as a system allowing a high level of reactivity in delivery the order to the customer (less than 5 minutes in most cases), taking into account the need to gather the various parts of the order (stored by product type).

BACKGROUND

Established sites are already known that comprise systems and implement methods that are for the most part based on manual preparations notions, which involves a large workforce to manage preparation peaks (low productivity) and a strong sub-activity in case of slack preparation periods.

The increase in flows causes a proportional increase in the number of operators working on preparation, or preparers. For certain volumes, the number of preparers is such that the productivity of each preparer decreases, as the operators interfere with each other in their movements. The decreased productivity then causes a need for additional operators: vicious circle, "traffic jam" phenomenon.

Furthermore, the manual solutions are based on very restrictive operator tasks: large amounts of walking, significant carrying of packages and heavy items, without assistance. The observed results show many work stoppages by operators.

The rare automated systems that currently exist only manage one of the flows described above (preparation flow and order delivery flow), but never both at the same time.

The invention therefore aims to resolve the aforementioned problems, among others.

SUMMARY OF THE INVENTION

The present invention provides a preparation and delivery system, for example in containers, for orders for consumer products, those products being able to be of different natures, in particular dry products, cold products and frozen products. The system makes it possible to distribute products into at least two different categories depending on their nature.

The system comprises at least two order preparation zones intended to prepare products of the first and second categories, respectively.

Each of these order preparation zones comprises:

one or more storage and preparation zones for products to be withdrawn, one or more storage and reconciliation zones for storing containers containing the withdrawn products, comprising at least one device for supplying complete orders for the corresponding product category, a conveying system for conveying empty or full containers from the storage and preparation zone(s) for products to be withdrawn toward the storage and reconciliation zone(s), and vice versa.

Alternative embodiments of the system are provided below, each of which can be considered alone or in combination with one or more other alternatives.

For at least one of the order preparation zones, the device(s) for providing complete orders for the corresponding product category comprise at least one gripping device for the containers.

The gripping device can be a gripping robot able to move along three axes.

For at least one of the order preparation zones, the device(s) for providing complete orders for the corresponding product category comprise at least one rotating cabinet.

For at least one of the order preparation zones, the system also comprises a system for managing and optimizing the locations of the containers, preferably computerized, able to steer the device for providing complete orders for the corresponding product category.

For at least one of the order preparation zones, the system comprises one or more empty container storage zones.

The system comprises a zone for shipping or delivering orders, or a zone for withdrawing orders to be delivered, with which the devices for providing complete orders by product category communicate.

The zone for withdrawing orders to be delivered is preferably arranged, and the devices for providing complete orders are preferably arranged, so as to limit the movements necessary for an operator to deliver the order to a customer quickly.

The system comprises a product inventory management and optimization system, which is preferably computerized.

The system comprises an automatic order distributor, able to allow the distribution of the prepared orders placed in the withdrawal zone for orders to be delivered, without operator intervention.

According to one example embodiment of the invention, the conveyance system is configured to allow containers to be conveyed automatically in front of the storage and preparation zones for products to be withdrawn for the order, and stopping those containers in front of those zones, and to allow the containers to pass in front of the storage and preparation zones for products to be withdrawn not affected by the order without stopping in front of those zones.

According to another example embodiment of the invention, the system for conveying the containers is manual in the storage and preparation zones, in particular for cold and/or frozen products.

According to a second aspect, the invention also relates to a method for preparing and delivering product orders, such as consumer products, making it possible to distribute those products in at least two different categories based on their nature.

The method comprises at least two order preparation steps carried out respectively in two order preparation zones designed to prepare products for the first and second categories, respectively.

Each of these two order preparation steps comprises:

a step for withdrawing products in one or more storage and preparation zones of the products to be withdrawn and placing them in containers, a step for reconciling the withdrawn products contained in the containers, in one or more storage and reconciliation zones, using at least one device for providing complete orders for the corresponding product category, at least one step for using a conveying system to convey empty or full containers from the storage and preparation zone(s) for products to be withdrawn toward the storage and reconciliation zone(s), and vice versa.

Alternative embodiments are provided below, each of which can be considered alone or in combination with one or more other alternatives.

The positioning of the containers in the storage and reconciliation zone(s) is managed by a position management system, such that the containers of a same order are positioned in a stack or close to each other.

This position management system for the containers uses downtime to reorganize the positioning of the containers of a same order so as to group them together and bring them close to a device for providing the complete orders for the corresponding product category, so as to allow quick delivery of the order to the customer.

The number of containers necessary for the corresponding product category [is] determined at the beginning of the preparation step.

The number of empty containers necessary for the corresponding product category is provided and conveyed over a circuit allowing the containers to pass in front of all of the storage and preparation zones for the products to be withdrawn for the order and to stop in front of those zones, and to pass in front of all of the storage and preparation zones for products to be withdrawn that are not affected by the order without stopping in front of those zones.

The provision of empty containers is done automatically by a gripping device such as a gripping robot (16) able to move along three axes, and the conveying circuit is an automatic conveying circuit.

The invention thus makes it possible to respond to the issues raised by the "Drive" context:

storage of the products to be prepared, preparation with a productivity level that makes it possible to absorb peaks without having to mobilize an excessive workforce, minimal transport of tubs of products by the operator, other than loading the customer's vehicle, simultaneous management of preparation and storage/retrieval flows for orders, whether they are single-unit, multi-unit, homogenous or mixed (depending on the type of product), storing prepared orders by product type, making it possible to eliminate time for the customer to retrieve the order, provision, after optimizing storage, of all of the containers making up an order, irrespective of the nature of the products, in a time compatible with the required constraints.

The invention therefore provides simultaneous management of the order preparation and delivery flows.

The invention also makes it possible to shorten preparation time, with a minimum length of time between placement of the order and recovery of the order in the warehouse that is shorter than in the existing preparation modes.

The invention significantly increases the storage capacity per square meter of warehouse for prepared orders awaiting pickup. In fact, with manual solutions, each prepared order takes approximately 1.5 m$^2$, whereas according to the invention, it has been observed that each prepared order occupies less than 0.6 m$^2$.

BRIEF DESCRIPTION OF THE DRAWING

Other features and advantages of the invention will appear more clearly upon reading the following description of preferred alternative embodiments of the system and implementation of the method, which are provided as non-limiting examples in reference to the appended drawing, which diagrammatically shows a top view of one example system according to the invention.

This FIGURE diagrammatically shows one example of a system for preparing and delivering orders of the "Drive" type, for consumer products distributed into three categories based on the nature of the products: dry products, cold products, frozen products.

DETAILED DESCRIPTION

The system comprises a warehouse 13 in which the products available for sale are stored, and in which the method is implemented, in particular mechanized order preparation.

A space 14 is provided to allow customers to park their vehicle when picking up their order.

In this FIGURE, the flows of products and containers are shown by arrows 18 or 19, depending on whether the containers are conveyed automatically or by operators.

The shipment of the product by truck is done in the zone 17.

Each customer order is recorded, sequenced and split by the computer management system for the warehouse so that all of the products in it are assigned to one or more preparation containers, such as tubs. More specifically, one or more preparation containers are assigned for dry products, one or more preparation containers are assigned for cold products, and one or more preparation containers are assigned for frozen products. Each order can therefore be made up of one or more types depending on the number, nature and volume of the items in question.

When processing of an order is launched, i.e., when the decision is made to begin preparing an order, the order is assigned the number of tubs needed to contain it in its entirety, for each of the categories in question (dry products, cold products, frozen products).

This is followed by launching the processing of each order for each of the categories, as described below.

Dry Product Storage and Preparation Zone 1a, 1b

The products or items available for sale are stored in furniture in a sequenced manner allowing them to be picked up manually by an operator 15.

Products with a strong rotation, i.e., frequently ordered by customers, are stored in the storage and preparation zones 1b for quick handling by operators 15.

Products with a lower rotation are stored in the storage and preparation zone 1a.

The empty tubs, provided by a provision device 16 when an order is launched, as will be explained below, are conveyed automatically on a conveying system 4 of the collector circuit 4 or conveyor 4 type.

This collector circuit is designed to be steered to allow the tubs to pass in front of all of the storage and preparation zones 1a, 1b.

For each storage and preparation zone 1a, 1b, the tubs in question, i.e., designed to contain the items stored and withdrawn in those zones, are provided by an operator 15. The latter deposits the item(s) from his sector in each tub.

These storage or preparation zones 1a, 1b, or preparation stations 1a, 1b, are arranged so as to have the best ergonomics for the operator 15 relative to the arrangement of the products, and to thereby limit the operator's movements. Furthermore, the tubs being prepared stay on the conveyor 4 in order to minimize carrying heavy loads.

The tubs not affected by a zone pass through without stopping in the zone.

The tubs prepared in each zone continue to travel, optionally stopping at the following zone.

At the end of preparation, after passage in all of the affected zones or stations 1a, 1b, the full tubs are conveyed to the order storage and reconciliation zone 6.

Dry Product Order Storage and Reconciliation Zone 6

This order storage and reconciliation zone 6 comprises a gantry robot 16 moving along three axes, steered by location management and optimization software, to provide complete orders for the dry product category.

When the system is initialized, this zone 6 is made up of stacks of empty tubs designed to supply the order preparation process. Subsequently, the empty tubs are stored in a zone 2 inside the order storage and reconciliation zone 6, also covered by a gantry robot 16.

A device for gripping the tubs, placed at the end of the robot 16, makes it possible to form stacks and/or to move at will in the action area of the robot.

When an order is launched, as explained above, the robot 16 delivers the empty tubs, preferably by unit, to the collector and conveying circuit 4 for order preparation, based on demand.

When the tubs or containers are done being prepared, i.e., when they are full or there are no more products to add, they return to the entry to the order storage and reconciliation zone 6.

These containers are then stored, for example on the ground, as close as possible to the output zone 11, or withdrawal zone 11 for orders to be shipped or delivered.

Initially, each location intended to receive the containers in the zone 6 corresponds to one order. When an order is made up of several tubs, the subsequent tubs are placed on the first one so as to form a stack of tubs corresponding to the same order. Ultimately, the storage consists of stacks of full tubs each corresponding to a customer order.

In order to optimize the storage and retrieval process, the system can also stack several orders to increase the storage capacity.

Likewise, when the system is not addressed by high-priority actions such as removing or delivering an order to the withdrawal zone 11, the arrival of a full tub in the zone 6, the exit of an empty tub toward the storage and preparation zones 1a, 1b, it reorganizes the stored tubs so as to bring the orders closer to the exit interface made up of the withdrawal zone 11, bringing the empty tubs closer to the empty tub exit onto the conveyor circuit 4, to stack or unstack orders to optimize retrieval times based on the volume to be stored.

When the customer arrives to take delivery of his order by entering the space 14, the device 16 for providing complete orders automatically delivers all of the tubs from his order using an ergonomic interface (placement on a cart, for example) toward the withdrawal zone for orders to be delivered 11. This action takes priority over the rest of the actions of the gantry robot 16 (taking out empty tubs, entry of prepared orders, reorganization of the inventory, etc.).

Once the tubs have been emptied of its items, they are reintegrated into inventory for a new cycle.

Cold Product Storage and Preparation Zone 7

The products available for sale are stored on pallets in a sequenced manner allowing them to be picked up manually by an operator 15, in the storage and preparation zone 7.

The empty tubs, provided to an operator, are manually withdrawn when a cold product order is launched, for example by means of a withdrawal order on the operator's mobile terminal.

The products are withdrawn by the operator manually based on the list displayed on his mobile terminal, in one or more containers. The containers, duly filled, are then manually arranged and stored in a storage and reconciliation zone for the cold products corresponding to a sub-zone of the cold product storage and preparation zone 7.

Cold product order storage and reconciliations zone

This storage and reconciliation zone comprises a rotating cabinet 8 allowing completed orders to be provided for the cold product category.

This rotating cabinet 8 allows the storage and fast retrieval of orders for cold product thus prepared. The entry point for this cabinet 8 is situated inside the cold product storage and preparation zone 7, while the exit point communicates with the withdrawal zone 11 for orders to be delivered.

In order to preserve the cold chain, a flap opens when there is a request to remove tubs from the zone. In all other cases, the flap remains closed.

When a customer arrives to take delivery of his order, all of the tubs or containers comprising his order are automatically provided at the withdrawal zone for orders to be delivered 11.

Frozen Product Storage and Preparation Zone 9

The frozen products available for sale are stored on pallets in a sequenced manner allowing them to be picked up manually by an operator in the zone 9.

The empty tubs, provided to the operator, are withdrawn manually when an order for frozen products is launched, for example using a withdrawal order on the operator's mobile terminal.

The products are withdrawn by the operator manually based on the list displayed on his mobile terminal, in one or more containers. The containers, duly filled, are then manually arranged and stored in a storage and reconciliation zone for the frozen products corresponding to a sub-zone of the frozen product storage and preparation zone 9.

Storage in this zone is done at a location determined by the warehouse inventory management software and indicated using labels. This location is stored for future retrieval.

Frozen product order storage and reconciliations zone

This storage and reconciliation zone comprises a device 10 for providing completed orders for the frozen product category, which may be a static cabinet 10, for example a simple shelf 10.

Each box of this cabinet 10 is identified by a unique inventory number, i.e., on the side of the storage and preparation zone 9, and identified by lighted protective glass on the side of the withdrawals zone 11.

No tub movement occurs once the operator has deposited it in a location.

The entry point of that static cabinet 10 is therefore situated in the frozen zone 9 or the storage and preparation zone 9 for frozen products to be withdrawn, behind that cabinet 10.

The outlet of that static cabinet 10 communicates with the withdrawal zone for orders to be delivered or shipped 11, via glass doors making it possible to preserve the cold chain.

When a customer arrives in the area 14 to take delivery of his order, the location of the tubs to be withdrawn is indicated, by means of the lighted protective glass on the static cabinet 10.

Withdrawal Zone for Orders to be Delivered 11

This zone 11 is a recovery zone for tubs making up a complete order, for delivery to the customer.

When the latter indicates his presence and parks his vehicle in the space 14 provided to that end, the system provides all of the containers making up the order, with all products combined.

In a single trip, an operator can therefore collect all of those tubs, starting with the dry products, and deliver to the end customer in a very short amount of time.

The system can be automated, so as to allow the provision of orders to customers without operator intervention. In this configuration, the system comprises an automatic distributor suitable for removing orders 24 hours a day, 7 days a week, which may for example be situated at the outlet 12 of the withdrawal zone 11 for withdrawing orders to be delivered.

It is recalled that the entire description above is provided as an example and is not limiting with respect to the invention.

The invention claimed is:

1. A method for preparing and delivering product orders, the method comprising:
   distributing products of a first storage category into a first storage and order preparation zone of a warehouse, and distributing products of a second storage category into a second storage and order preparation zone of the warehouse based on storage conditions for the products, the first storage and order preparation zone and the second storage and order preparation zone having different storage conditions;
   in response to an order, carrying out order preparation steps in each of the first and second storage and order preparation zones for preparing products of the first and second storage categories, respectively, said order preparation steps comprising:
      withdrawing products of the first storage category from a first storage location in the first storage and preparation zone and placing the withdrawn products of the first storage category in containers in the first storage and preparation zone, and withdrawing products of the second storage category from a second storage location in the second storage and preparation zone and placing the withdrawn products of the second storage category in containers in the second storage and preparation zone,
      reconciling the products of the first storage category contained in the containers in at least one first storage and reconciliation zone using at least one device for providing complete orders for the first storage category, and reconciling the products of the second storage category contained in the containers in at least one second storage and reconciliation zone using at least one device for providing complete orders for the second storage category,
      using a conveying system to convey empty or full containers from the first storage and preparation zone toward the first storage and reconciliation zone, and vice versa, and using a conveying system to convey empty or full containers from the second storage and preparation zone toward the second storage and reconciliation zone, and vice versa.

2. The method as recited in claim 1 wherein, for at least one of the order preparation zones, the device for supplying complete orders for the corresponding product category includes at least one rotating cabinet.

3. The method as recited in claim 1 wherein, for at least one of the order preparation zones, the device for supplying complete orders for the corresponding product category includes at least one gripping device for the containers.

4. The method as recited in claim 3 wherein, for at least one of the order preparation zones, the device for supplying complete orders for the corresponding product category includes at least one rotating cabinet.

5. The method as recited in claim 3 wherein the gripping device is a gripping robot able to move along three axes.

6. The method as recited in claim 5 wherein, for at least one of the order preparation zones, the device for including complete orders for the corresponding product category includes at least one rotating cabinet.

7. The method as recited in claim 1 further comprising, for at least one of the order preparation zones, a system for managing and optimizing the locations of the containers and able to steer the device for supplying complete orders for the corresponding product category.

8. The method as recited in claim 7 further comprising for at least one of the order preparation zones, one or more empty container storage zones.

9. The method as recited in claim 7 wherein the system for managing and optimizing the locations of the containers is computerized.

10. The method as recited in claim 1 further comprising, for at least one of the order preparation zones, one or more empty container storage zones.

11. The method as recited in claim 1 further comprising a zone for withdrawing orders to be delivered, the device for supplying complete orders by product category communicating with the zone for withdrawing orders.

12. The method as recited in claim 11 wherein the device for supplying complete orders from each product category is arranged so as to limit the movements necessary for an operator to deliver the order to a customer.

13. The method as recited in claim 12 wherein the zone for withdrawing orders to be delivered is arranged so as to limit the movements necessary for an operator to deliver the order to a customer.

14. The method as recited in claim 1 further comprising a product inventory management and optimization system.

15. The method as recited in claim 1 further comprising an automatic order distributor.

16. The method as recited in claim 1 wherein the conveyance system is configured to allow containers to be conveyed automatically in front of the storage and preparation zones for products to be withdrawn for the order, and stopping those containers in front of those zones, and to allow the containers to pass in front of the storage and preparation zones for products to be withdrawn not affected by the order without stopping in front of those zones.

17. The method as recited in claim 1 wherein the positioning of the containers in the storage and reconciliation zone is managed by a position management system, such that the containers of a same order are positioned in a stack or close to each other.

18. The method as recited in claim 17 wherein the position management system for the containers uses downtime to reorganize the positioning of the containers of a same order so as to group them together and bring them close to a device for providing the complete orders, so as to allow time-optimized delivery of the order to the customer.

19. The method as recited in claim 18 wherein at the beginning of each of the preparation steps, a number of containers necessary for the corresponding product category is determined at the beginning of the preparation step.

20. The method as recited in claim 19 wherein a number of empty containers necessary for the corresponding product category is provided and conveyed over a circuit allowing the containers to pass in front of all of the storage and preparation zones for the products to be withdrawn for the order and to stop in front of those zones, and to pass in front of all of the storage and preparation zones for products to be withdrawn that are not affected by the order without stopping in front of those zones.

21. The method as recited in claim 20 wherein the provision of empty containers is done automatically by a gripping robot able to move along three axes, and in that the conveying circuit is an automatic conveying circuit.

22. The method as recited in claim 1 wherein said at least two different categories are chosen from: dry products, cold products, and frozen products.

* * * * *